United States Patent
Rose

(10) Patent No.: US 8,257,039 B2
(45) Date of Patent: Sep. 4, 2012

(54) GAS TURBINE ENGINE CASE WITH REPLACED FLANGE AND METHOD OF REPAIRING THE SAME USING COLD METAL TRANSFER

(75) Inventor: William M. Rose, Warren, MA (US)

(73) Assignee: United Technologies Corporation, Hartford, CT (US)

( * ) Notice: Subject to any disclaimer, the term of this patent is extended or adjusted under 35 U.S.C. 154(b) by 1419 days.

(21) Appl. No.: 12/113,980

(22) Filed: May 2, 2008

(65) Prior Publication Data

US 2009/0274556 A1    Nov. 5, 2009

(51) Int. Cl.
*F04D 29/52* (2006.01)
(52) U.S. Cl. ............... 415/215.1; 415/220; 29/889.1
(58) Field of Classification Search .......... 415/215.1, 415/220; 29/889.1
See application file for complete search history.

(56) References Cited

U.S. PATENT DOCUMENTS

| | | | |
|---|---|---|---|
| 2,940,779 A * | 6/1960 | Del Buono | 285/114 |
| 4,549,058 A | 10/1985 | DelMastro et al. | |
| 5,180,281 A | 1/1993 | Burge | |
| 5,230,540 A * | 7/1993 | Lewis et al. | 285/363 |
| 5,360,961 A | 11/1994 | Ingall et al. | |
| 5,645,399 A | 7/1997 | Angus | |
| 5,823,739 A | 10/1998 | VanDuyn | |
| 6,106,233 A | 8/2000 | Walker et al. | |
| 6,219,916 B1 | 4/2001 | Walker et al. | |
| 6,353,198 B1 | 3/2002 | Tong et al. | |
| 6,467,988 B1 * | 10/2002 | Czachor et al. | 403/337 |
| 6,487,491 B1 | 11/2002 | Karpman | |
| 6,493,936 B2 | 12/2002 | Doi et al. | |
| 6,531,005 B1 | 3/2003 | Bezerra et al. | |
| 6,609,894 B2 | 8/2003 | Mukira et al. | |
| 6,755,924 B2 | 6/2004 | Harrison et al. | |
| 6,888,090 B2 | 5/2005 | Murphy | |
| 7,165,934 B2 * | 1/2007 | Reigl | 415/108 |
| 7,220,941 B2 | 5/2007 | Niedereder | |
| 7,230,203 B2 | 6/2007 | Wimroither | |
| 7,244,320 B2 | 7/2007 | Malley et al. | |
| 7,256,368 B2 | 8/2007 | Artelsmair | |
| 7,259,349 B2 | 8/2007 | Stieglbauer | |
| 7,291,808 B2 | 11/2007 | Burgstaller | |
| 2006/0125234 A1 | 6/2006 | Ernst | |
| 2007/0056944 A1 | 3/2007 | Artelsmair | |
| 2007/0221631 A1 | 9/2007 | Ruokolainen | |

FOREIGN PATENT DOCUMENTS

WO    2006125234    11/2006

OTHER PUBLICATIONS

Fronius brochure (www.fronius.com), Jan. 2007.

(Continued)

*Primary Examiner* — Igor Kershteyn
(74) *Attorney, Agent, or Firm* — Carlson, Gaskey & Olds, PC

(57) ABSTRACT

A method of repairing an engine case for a gas turbine engine includes the steps of identifying a damaged flange on an engine case, removing the damaged flange down to a surface of the engine case to receive a replacement flange. The replacement flange is placed on the surface, and welded to the surface utilizing cold metal transfer.

10 Claims, 4 Drawing Sheets

OTHER PUBLICATIONS

Article found at www.aws.org/wj/2005106/0381 entitled: "Cold Metal Transfer Has a Future Joining Steel to Aluminum" by Jergen Bruckner, Apr. 29, 2008.

Summary Report, SR0706, Cooperative Research Program, Jun. 2007.

"Improved Methods for High-Alloy Buildups", EWi, Materials Joining Technology, Jun. 28, 2007.

U.S. Appl. No. 12/114,836, filed May 5, 2008.

U.S. Appl. No. 12/113,987, filed May 2, 2008.

* cited by examiner

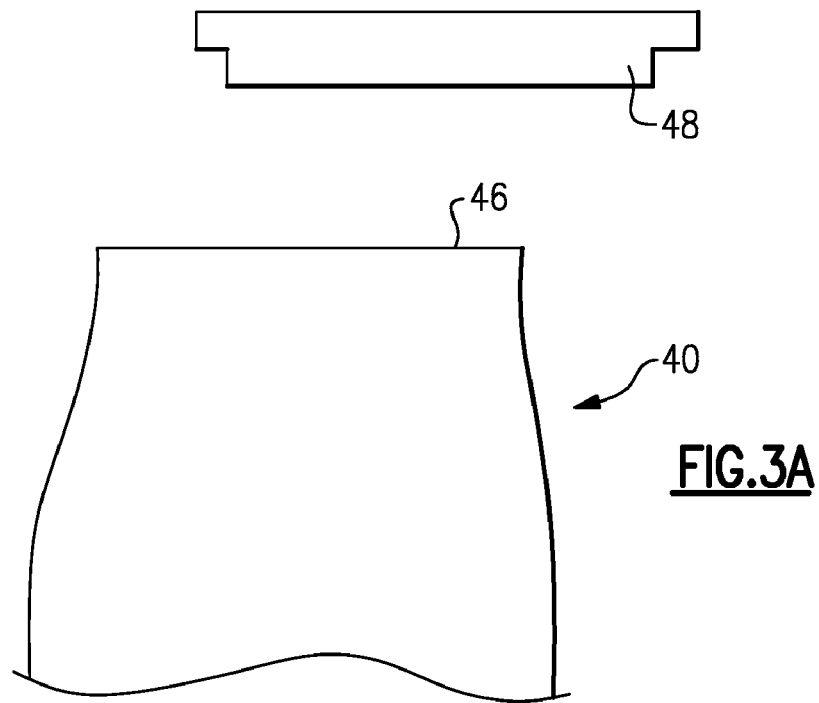
FIG.3A
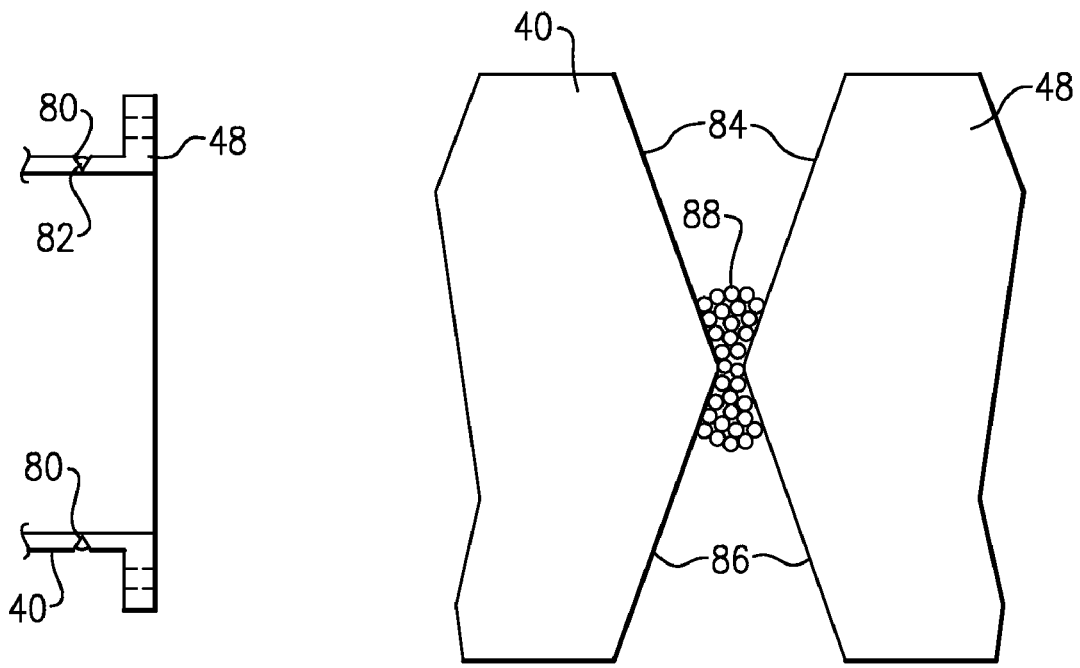
FIG.3B
FIG.3C

GAS TURBINE ENGINE CASE WITH REPLACED FLANGE AND METHOD OF REPAIRING THE SAME USING COLD METAL TRANSFER

BACKGROUND OF THE INVENTION

This application relates to a repaired gas turbine engine case and method of repair, wherein cold metal transfer is utilized for a replacement weld joint to attach a replacement flange.

Gas turbine engines are known, and include engine cases surrounding several core components. Engine cases typically abut other housing members at flanges, which may then be utilized to connect the engine case to the adjacent housing. The engine cases are subject to a harsh environment during service, and may be damaged. As an example, products of combustion at high temperature pass within the engine case.

Periodically, a gas turbine engine is taken out of service and reviewed for maintenance issues. One engine area that may be subject to repair is the flange of the engine case. In the past, the engine case has been removed, and the existing flange machined away. A replacement flange may then be attached.

At least one known prior art process for attaching the flange generally includes use of an electron beam welding device. However, the devices are expensive to purchase and operate. Also, the devices are vacuum devices that extend repair time because of additional time to pump down a chamber to an acceptable pressure.

A process known as cold metal transfer ("CMT") developed by the Fronius Corporation has been incorporated into gas metal arc or metal inert gas ("MIG") welding systems. This process reduces the spatter often associated with MIG welding. This spatter has kept MIG welding from gaining popularity in the aerospace industry.

The term "cold" has to be understood in terms of a welding process. When compared to a conventional MIG/MAG process, CMT is a cold process. Its characteristic feature is alternating hot and relatively cold temperature. This alternating hot and cold treatment occurs by incorporating a welding wire motion into a process control.

The wire moves forward and into a weld pool. A short circuit occurs. As the short circuit happens, the wire is pulled back again. In this way, a weld arc only inputs heat very briefly in the arcing period, after which the thermal input is immediately reduced. In this way, the alternating hot and cold occurs.

The rearward movement of the wire assists weld material droplet detachment during the short circuit. The short circuit is thus controlled and kept small.

CMT has not been utilized in repair applications for gas turbine engine cases.

SUMMARY OF THE INVENTION

A method of repairing an engine case for a gas turbine engine includes identifying a damaged flange on an engine case, removing the damaged flange down to a surface of the case to receive a replacement flange, placing a replacement flange on the surface, and welding the replacement flange to the surface utilizing cold metal transfer. A repaired engine case is also claimed.

These and other features of the present invention may be best understood from the following specification and drawings, the following of which is a brief description.

BRIEF DESCRIPTION OF THE DRAWINGS

FIG. 3A shows a first step in a repair process.
FIG. 3B shows an alternative step.
FIG. 3C shows yet another alternative step.

DETAILED DESCRIPTION OF THE PREFERRED EMBODIMENT

Figure 1:
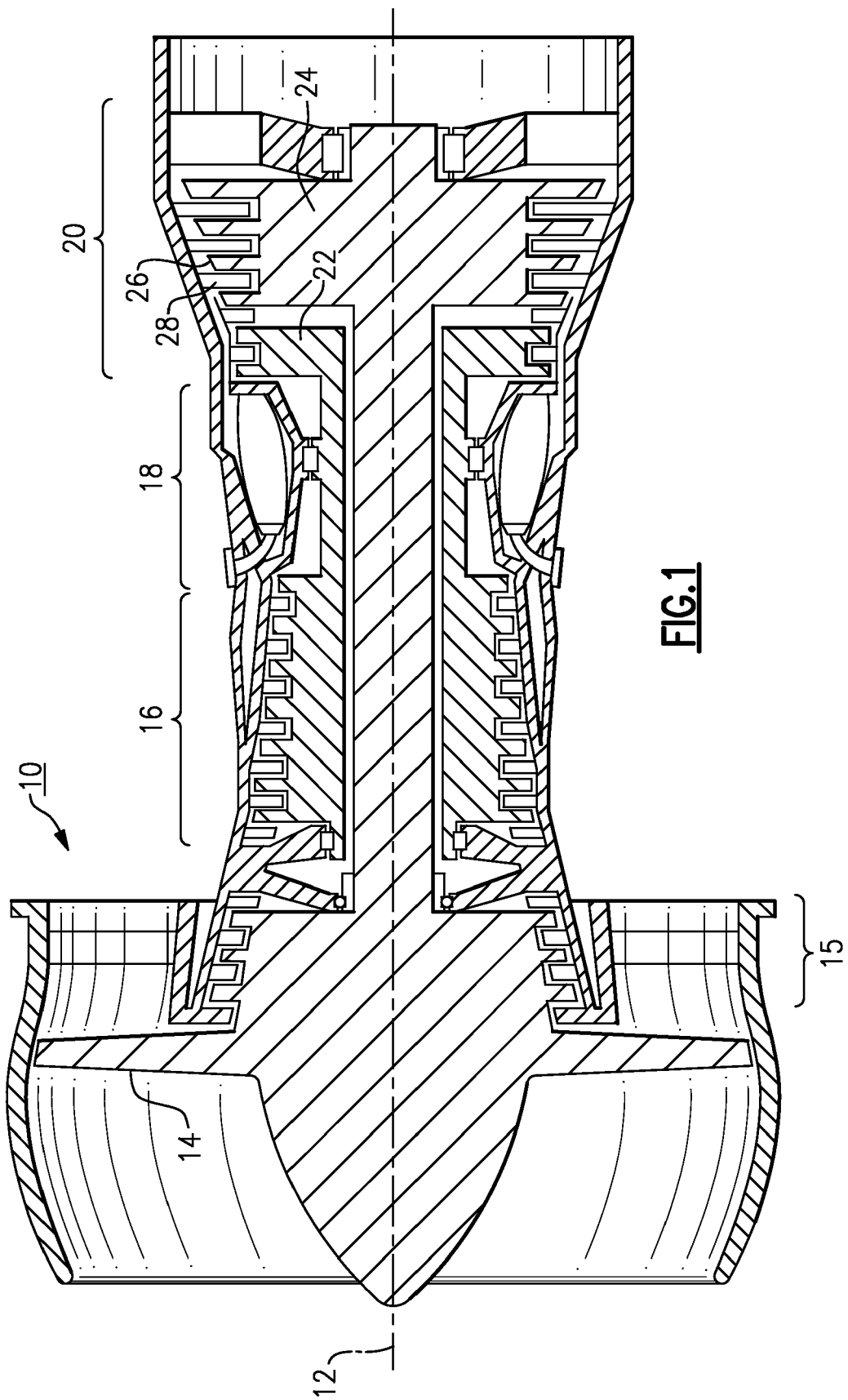
FIG. 1 is a schematic view of a gas turbine engine.

A gas turbine engine 10, such as a turbofan gas turbine engine, circumferentially disposed about an engine centerline, or axial centerline axis 12 is shown in FIG. 1. The engine 10 includes a fan 14, compressor sections 15 and 16, a combustion section 18 and a turbine 20. As is well known in the art, air compressed in the compressor 15, 16 is mixed with fuel and burned in the combustion section 18 and expanded in turbine 20. The turbine 20 includes rotors 22 and 24, which rotate in response to the expansion. The turbine 20 includes alternating rows of removable rotary airfoils or blades 26 and static airfoils or vanes 28. It should be understood that this schematic view is included to provide a basic understanding of the sections in a gas turbine engine, and is not to be limiting. This disclosure extends to all types of turbine engines for all types of applications.

The gas turbine engine 10 also includes an engine case surrounding internal engine components. The engine case is attached to adjacent housing parts at flanges at the end of the case. Over time, the engine case can wear at the flanges.

Figure 2A:
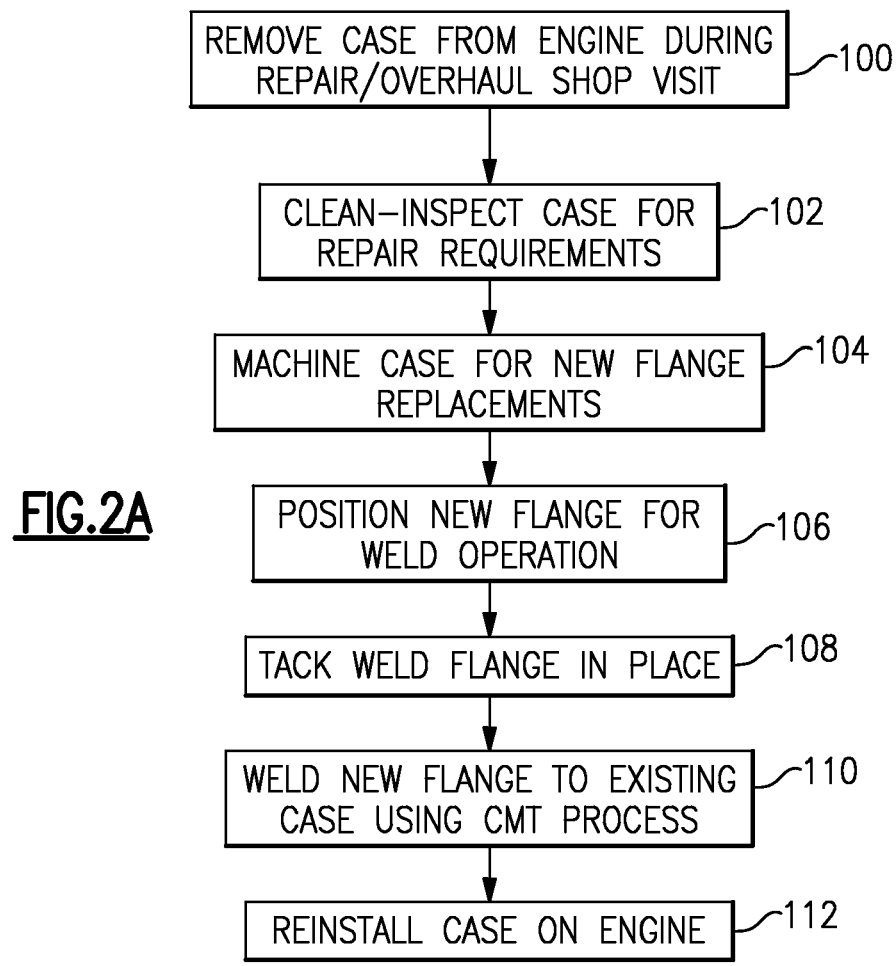
FIG. 2A is a flow chart of an exemplary repair method.
Figure 2B:
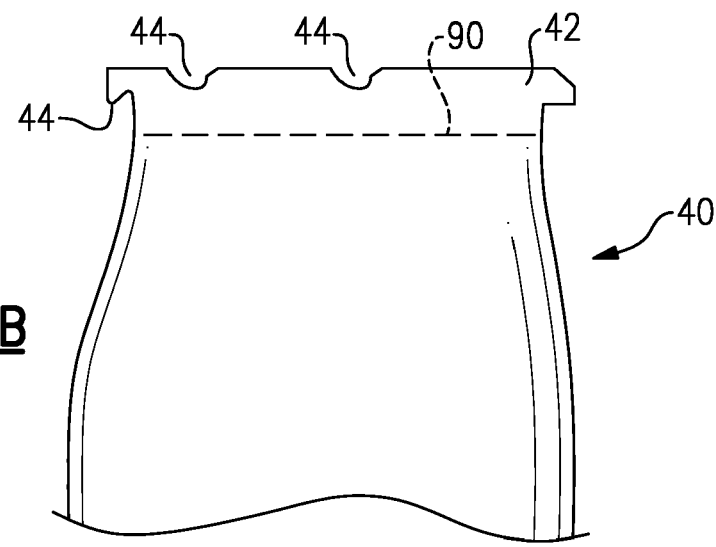
FIG. 2B shows a worn engine case.

FIG. 2A is a flow chart of a method of repairing a worn engine case 40 such as is shown in FIG. 2B. The initial step 100 is to removed the case 40 from the engine 10, for example, during a repair or overhaul shop visit. The case 40 is cleaned and inspected at step 102 for repair requirements. For example, as shown in FIG. 2B, a number of worn or damaged areas 44 may exist on a flange 42 of the engine case 40. These areas 44 may be identified for repair prior to the engine case 40 being reinstalled on the engine 10.

An initial step 104 in the repair of the engine case 40 is to remove the existing flange 42 down to a substantially flat surface 46 as shown in FIG. 3A. This can be achieved by cutting down to dashed line 90 as shown in FIG. 2B. FIG. 3A shows the surface 46 as a substantially flat surface. A replacement flange 48 may then be utilized.

FIG. 3B shows a preferred preparation for the surface between the two components, engine case 40 and the replacement flange 48. As shown, chamfers 80 may be formed on both surfaces to create a gap to receive weld material 82. This so-called "V" preparation may be used on both the components or just one of the components. Such preparation has been utilized in the past with cold metal transfer techniques, and is particularly desirable for the disclosed embodiment.

FIG. 3C shows yet another preparation for the surface between the two components, engine case 40 and the replacement flange 48. As shown, an outer chamfer 84 and a radially inner chamfer 86 are formed on each of the components to hold the weld material 88. Again, the chamfer may be formed on only one of the two components, or may be formed on both.

Cutting techniques may be utilized to remove the existing flange 42. As one example, the engine case can be placed on a turret lathe and the existing flange cut away with a cutting tool. Of course, other methods of removing the existing flange could be utilized consistent with this application.

Figure 3D:
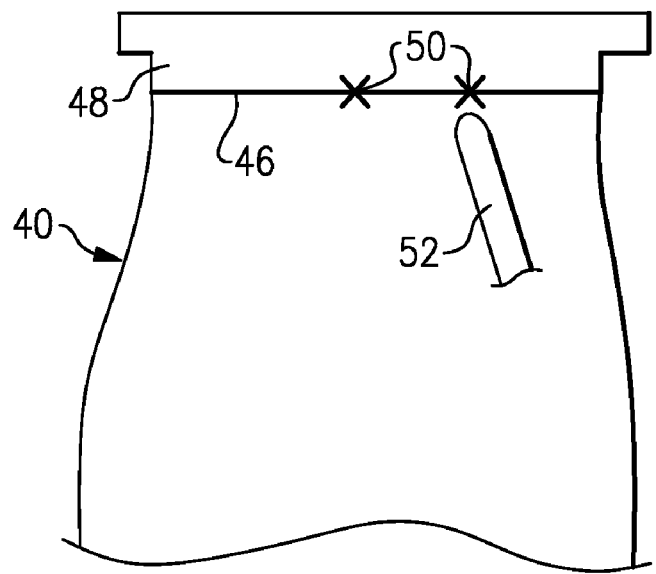
FIG. 3D shows a subsequent step.

As shown in FIG. 3D, the replacement flange 48 is positioned on the surface 46 at step 106. A tack welding device 52 may then apply tack welds 50 to hold the replacement flange 48 on the surface 46 at step 108.

Figure 3E:
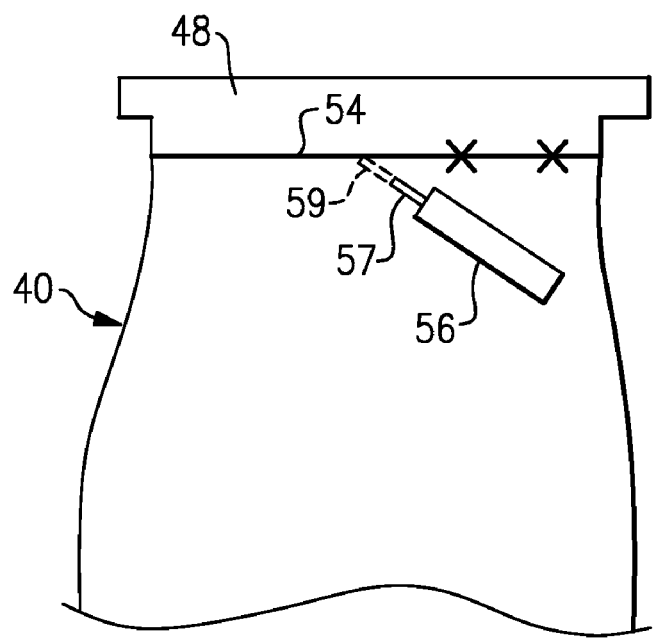
FIG. 3E shows a final step in the repair process.

As shown in FIG. 3E, a final weld joint 54 may be applied along the surface 46 to secure the replacement flange 48 to the engine case 40 at step 110. The engine case may now be reinstalled on the engine at step 112.

The welding equipment 56 may be a cold metal transfer welding equipment. Although cold metal transfer is known, the process has not been utilized for the replacement of a flange on an engine case as disclosed in the exemplary embodiments. As mentioned above, CMT is a process having alternating hot and cold operation as a short circuit repeats with controlled movement of a weld wire 57. As known, the wire may move towards and away from the surface as shown in phantom at 59. Of course, this is a schematic view of the process.

Although exemplary embodiments have been disclosed, a worker of ordinary skill in this art would recognize that certain modifications would come within the scope of this invention. For that reason, the following claims should be studied to determine the true scope and content of this invention.

What is claimed is:

1. A method of repairing an engine case for a gas turbine engine, the method comprising the steps of:
   a) identifying a damaged flange on an engine case;
   b) removing the damaged flange down to a surface of the engine case to receive a replacement flange;
   c) placing the replacement flange on the surface; and
   d) welding the replacement flange to the surface utilizing cold metal transfer.

2. The method as set forth in claim 1, wherein tack welds hold the replacement flange on the engine case prior to the step d) welding.

3. The method as set forth in claim 1, wherein step b) includes providing a substantially flat surface machined on the engine case to receive the replacement flange.

4. The method as set forth in claim 1 wherein step b) includes providing at least one chamfer at a surface between the engine case and the replacement flange.

5. The method as set forth in claim 1, wherein the cold metal transfer includes moving a wire towards and away from the surface to provide alternating hot and cold operation.

6. A method of forming an engine case for a gas turbine engine, the method comprising the steps of:
   forming a surface on the engine case to receive a flange;
   placing a flange on the surface; and
   welding the flange to the surface utilizing cold metal transfer.

7. The method as set forth in claim 6, wherein tack welds hold the flange on the engine case prior to the welding.

8. The method as set forth in claim 6, including the step of providing a substantially flat surface machined on the engine case to receive the flange.

9. The method as set forth in claim 6 including the step of providing at least one chamfer at a surface between the engine case and the flange.

10. The method as set forth in claim 6 wherein the cold metal transfer includes moving a wire towards and away from the surface to provide alternating hot and cold operation.

* * * * *